(12) United States Patent
Moulthrop et al.

(10) Patent No.: US 7,601,207 B2
(45) Date of Patent: Oct. 13, 2009

(54) GAS RECOVERY SYSTEM

(75) Inventors: Lawrence Clinton Moulthrop, Windsor, CT (US); Everett Bragg Anderson, Glastonbury, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 273 days.

(21) Appl. No.: 11/691,726

(22) Filed: Mar. 27, 2007

(65) Prior Publication Data

US 2008/0236396 A1 Oct. 2, 2008

Related U.S. Application Data

(63) Continuation-in-part of application No. 11/047,119, filed on Jan. 31, 2005, now Pat. No. 7,241,522, which is a continuation of application No. 09/966,727, filed on Sep. 28, 2001, now Pat. No. 6,887,601.

(60) Provisional application No. 60/236,278, filed on Sep. 28, 2000.

(51) Int. Cl.
*B01D 53/02* (2006.01)
(52) U.S. Cl. .................. 96/134; 96/45; 96/54; 429/13
(58) Field of Classification Search .................. 96/134, 96/121; 95/45, 54; 429/12, 27
See application file for complete search history.

(56) References Cited

U.S. PATENT DOCUMENTS

| 6,168,705 | B1 | 1/2001 | Molter et al. |
| 2003/0062268 | A1 | 4/2003 | Kosek et al. |
| 2004/0028979 | A1 | 2/2004 | Ballantine et al. |
| 2005/0129996 | A1* | 6/2005 | Moulthrop et al. ............ 429/17 |
| 2005/0199124 | A1* | 9/2005 | Little et al. .................... 95/96 |

FOREIGN PATENT DOCUMENTS

WO 03/075379 A2 6/2003

OTHER PUBLICATIONS

Moulthrop, L. et al.; "High Pressure Hydrogen Generation by PEM Electrolysis"; Presented at the National Hydrogen Association 15th U.S. Hydrogen Conference; Apr. 2004; (p. 1-11).

* cited by examiner

*Primary Examiner*—Robert J Hill, Jr.
*Assistant Examiner*—Karla Hawkins
(74) *Attorney, Agent, or Firm*—Cantor Colburn LLP

(57) ABSTRACT

A gas recovery system is disclosed. The gas recovery system includes a gas source productive of a gaseous stream comprising moisture, a gas dryer in fluid communication with and downstream of the gas source, and an electrochemical compressor in fluid communication with and downstream of the gas dryer. The gas dryer is disposed to receive the gaseous stream and produce a delivery stream absent moisture and a slipstream comprising moisture. The electrochemical compressor is disposed to receive the slipstream at a first pressure and produce a compressed stream at a second pressure greater than the first pressure.

22 Claims, 3 Drawing Sheets

GAS RECOVERY SYSTEM

CROSS REFERENCE TO RELATED APPLICATIONS

This application is a continuation-in-part of prior U.S. patent application Ser. No. 11/047,119, filed on Jan. 31, 2005 now U.S. Pat. No. 6,887,601 which is a continuation of U.S. patent application Ser. No. 09/966,727, filed on Sep. 28, 2001, now U.S. Pat. No. 6,887,601 which claims the benefit of the filing date of U.S. Provisional Application Ser. No. 60/236,278 filed Sep. 28, 2000.

BACKGROUND OF THE INVENTION

The present disclosure relates generally to gas recovery systems, and particularly to gas recovery systems including an electrochemical compressor.

Electrochemical cells are energy conversion devices, usually classified as either electrolysis cells or fuel cells. A proton exchange membrane electrolysis cell can function as a hydrogen generator by electrolytically decomposing water to produce hydrogen and oxygen gas, and can function as a fuel cell by electrochemically reacting hydrogen with oxygen to generate electricity. Referring to FIG. 1, which is a partial section of a typical anode feed electrolysis cell 100, process water 102 is fed into cell 100 on the side of an oxygen electrode (anode) 116 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. The oxygen gas 104 and a portion of the process water 108 exit the cell 100 as byproducts 109, while protons 106 and water 110 migrate across a proton exchange membrane 118 to cathode 114 where hydrogen gas 112 is produced.

Another typical water electrolysis cell using the same configuration as is shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane.

A typical fuel cell uses the same general configuration as is shown in FIG. 1. Hydrogen, from hydrogen gas, methanol, or other hydrogen source, is introduced to the hydrogen electrode (the anode in fuel cells), while oxygen, or an oxygen-containing gas such as air, is introduced to the oxygen electrode (the cathode in fuel cells). Water can also be introduced with the feed gas. Hydrogen electrochemically reacts at the anode to produce protons and electrons, wherein the electrons flow from the anode through an electrically connected external load, and the protons migrate through the membrane to the cathode. At the cathode, the protons and electrons react with oxygen to form water, which additionally includes any feed water that is dragged through the membrane to the cathode. The electrical potential across the anode and the cathode can be exploited to power an external load.

In other embodiments, one or more electrochemical cells can be used within a system to both electrolyze water to produce hydrogen and oxygen, and to produce electricity by converting hydrogen and oxygen back into water as needed. Such systems are commonly referred to as regenerative fuel cell systems.

Electrochemical cell systems typically include a number of individual cells arranged in a stack, with the working fluids directed through the cells via input and output conduits or ports formed within the stack structure. The cells within the stack are sequentially arranged, each including a cathode, a proton exchange membrane, and an anode. The cathode and anode may be separate layers or may be integrally arranged with the membrane. Each cathode/membrane/anode assembly (hereinafter "membrane-electrode assembly", or "MEA") typically has a first flow field in fluid communication with the cathode and a second flow field in fluid communication with the anode. The MEA may furthermore be supported on both sides by screen packs or bipolar plates that are disposed within, or that alternatively define, the flow fields. Screen packs or bipolar plates may facilitate fluid movement to and from the MEA, membrane hydration, and may also provide mechanical support for the MEA.

In order to maintain intimate contact between cell components under a variety of operational conditions and over long time periods, uniform compression may be applied to the cell components. Pressure pads or other compression means are often employed to provide even compressive force from within the electrochemical cell.

It is often desired for an electrochemical cell system to deliver hydrogen absent water or moisture vapor. Dryers, including Pressure Swing Adsorption (PSA) units, are used to remove moisture from the hydrogen produced by the electrolysis cell. To maintain functionality, the PSA used in existing systems is regenerated, or purged with a slipstream of dry hydrogen. Because the slipstream purge, which can be about 5 to 15 percent of the hydrogen produced by the cell includes moisture, it is typically vented, or discarded. Accordingly, the electrolysis cell must produce about 5 to 15 percent more hydrogen than is actually delivered to an end user or end user system, reducing an overall productive efficiency of the electrochemical cell system. Additionally, it is desired to deliver the hydrogen with a pressure that is higher than that provided by the electrolysis cell. Mechanical compressors are often used to increase the pressure of the hydrogen. However, mechanical compressors consume power, and use moving parts that may require maintenance, thereby reducing an overall reliability and efficiency of the electrochemical cell system. Furthermore, mechanical compressors are not tolerant of moisture within the hydrogen. Accordingly, there is a need in the art for a hydrogen generation arrangement that overcomes these drawbacks.

BRIEF DESCRIPTION OF THE INVENTION

An embodiment of the invention includes a gas recovery system. The electrochemical cell system includes a gas source productive of a gaseous stream comprising moisture, a gas dryer in fluid communication with and downstream of the gas source, and an electrochemical compressor in fluid communication with and downstream of the gas dryer. The gas dryer is disposed to receive the gaseous stream and produce a delivery stream absent moisture and a slipstream comprising moisture. The electrochemical compressor is disposed to receive the slipstream at a first pressure and produce a compressed stream at a second pressure greater than the first pressure.

Another embodiment of the invention includes a method to increase a productive efficiency of a gas production system. The method includes producing a gaseous stream comprising moisture by a gas source, obtaining the gaseous stream and making available a dry delivery stream and a moist slipstream via a gas dryer, and recovering the moist slipstream from the gas dryer by an electrochemical compressor and adding it to the gaseous stream, thereby increasing the productive efficiency of the gas production system.

These and other advantages and features will be more readily understood from the following detailed description of preferred embodiments of the invention that is provided in connection with the accompanying drawings.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides an electrochemical compressor (ECC) capable of accepting a mixture of hydrogen and water to recover wet hydrogen used as a purge for dryers, such as the PSA. Accordingly, use of the ECC within an electrochemical cell system eliminates the venting loss of wet hydrogen, and thereby increases a productive efficiency of the electrochemical cell system. In an embodiment, the ECC increases the pressure of the hydrogen provided by the electrolysis cell, thereby eliminating the need to use mechanical compressors. In another embodiment, hydrogen and water vapor from a hydrogen/water phase separator is introduced to the ECC, thereby increasing the useful pressure of the supplied hydrogen.

Figure 2:
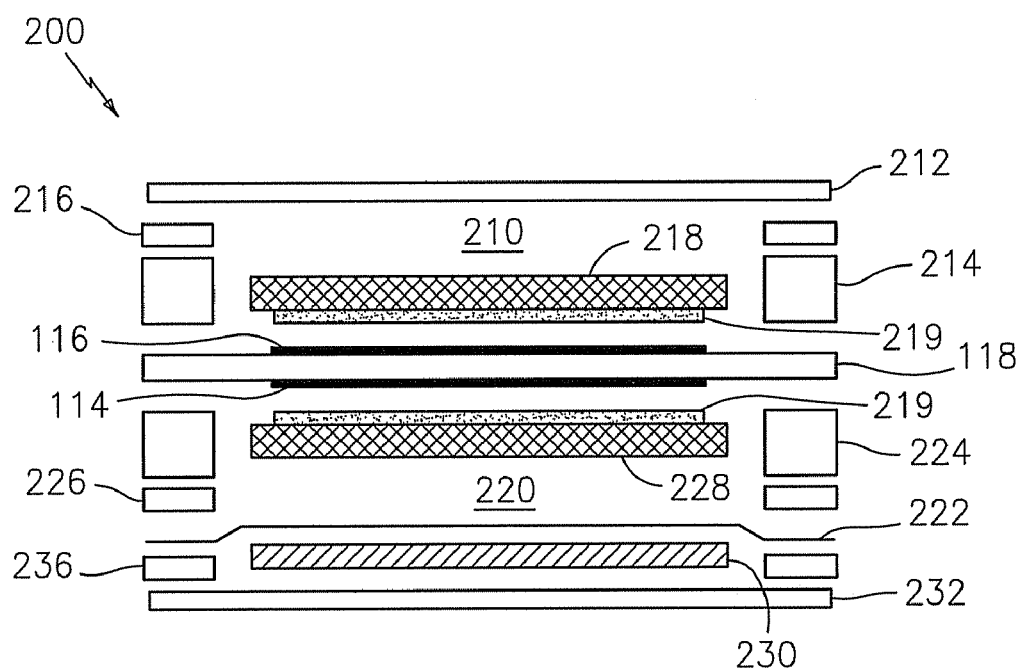
FIG. 2 depicts an exploded cross-section schematic diagram of an electrochemical cell for use in embodiments of the invention.

Referring to FIG. 2, an electrochemical cell 200 that may be suitable for operation as an anode feed electrolysis cell, cathode feed electrolysis cell, fuel cell, or regenerative fuel cell, is depicted schematically in an exploded cross section view. Thus, while the discussion below may be directed to an anode feed electrolysis cell, cathode feed electrolysis cells, fuel cells, and regenerative fuel cells are also contemplated. Cell 200 is typically one of a plurality of cells employed in a cell stack as part of an electrochemical cell system. When cell 200 is used as an electrolysis cell, voltage inputs are generally between about 1.48 volts and about 3.0 volts at current densities between about 50 A/ft2 (amperes per square foot) and about 4,000 A/ft2. When used as a fuel cell, voltage outputs range between about 0.4 volts and about 1 volt, at current densities of about 0.1 A/ft2 and about 10,000 A/ft2. The number of cells within the stack, and the dimensions of the individual cells is scalable to the cell power output and/or gas output requirements. Accordingly, application of electrochemical cell 200 may involve a plurality of cells 200 arranged electrically either in series or parallel depending on the application. Cells 200 may be operated at a variety of pressures, such as up to or exceeding 50 psi (pounds-per-square-inch), up to or exceeding about 100 psi, up to or exceeding about 500 psi, up to or exceeding about 2500 psi, or even up to or exceeding about 10,000 psi, for example.

In an embodiment, cell 200 includes a membrane 118 having a first electrode (e.g., an anode) 116 and a second electrode (e.g., a cathode) 114 disposed on opposite sides thereof. Flow fields 210, 220, which are in fluid communication with electrodes 116 and 114, respectively, are defined generally by the regions proximate to, and bounded on at least one side by, each electrode 116 and 114 respectively. A flow field member (also herein referred to as a screen pack) 228 may be disposed within flow field 220 between electrode 114 and, optionally, a pressure pad separator plate 222. A pressure pad 230 is typically disposed between pressure pad separator plate 222 and a cell separator plate 232. Cell separator plate 232 is disposed adjacent to pressure pad 230. A frame 224, generally surrounding flow field 220 and an optional gasket 226, is disposed between frame 224 and pressure pad separator plate 222 generally for enhancing the seal within the reaction chamber defined on one side of cell system 200 by frame 224, pressure pad separator plate 222 and electrode 114. Gasket 236 may be disposed between pressure pad separator plate 222 and cell separator plate 232 enclosing pressure pad 230.

Another screen pack 218 may be disposed in flow field 210. Optionally, screen packs 218, 228 may include a porous plate 219 as depicted. The porous plate 219 shall preferably be of conductive material, and may be included to provide additional mechanical support to the electrodes 116, 114. A frame 214 generally surrounds screen pack 218. A cell separator plate 212 is disposed adjacent screen pack 218 opposite oxygen electrode 116, and a gasket 216 may be disposed between frame 214 and cell separator plate 212, generally for enhancing the seal within the reaction chamber defined by frame 214, cell separator plate 212 and the oxygen side of membrane 118. The cell components, particularly cell separator plates 212, 232, frames 214, 224, and gaskets 216, 226, and 236 are formed with the suitable manifolds or other conduits as is conventional.

In an embodiment, membrane 118 comprises electrolytes that are preferably solids or gels under the operating conditions of the electrochemical cell. Useful materials include proton conducting ionomers and ion exchange resins. Useful proton conducting ionomers include complexes comprising an alkali metal salt, an alkali earth metal salt, a protonic acid, or a protonic acid salt. Useful complex-forming reagents include alkali metal salts, alkaline metal earth salts, and protonic acids and protonic acid salts. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyallcylenes, such as polyethylene glycol, polyethylene glycol monoether, and polyethylene glycol diether; copolymers of at least one of these polyethers, such as poly(oxyethylene-co-oxypropylene)glycol, poly(oxyethylene-co-oxypropylene)glycol monoether, and poly(oxyethylene-co-oxypropylene)glycol diether; condensation products of ethylenediamine with the above polyoxyallcylenes; and esters, such as phosphoric acid esters, aliphatic carboxylic acid esters or aromatic carboxylic acid esters of the above polyoxyallcylenes. Copolymers of, e.g., polyethylene glycol with diallcylsiloxanes, maleic anhydride, or polyethylene glycol monoethyl ether with methacrylic acid are known in the art to exhibit sufficient ionic conductivity to be useful.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins may include hydrates of tetrafluoroethylene-perfluorosulfonyl ethoxyvinyl ether or tetrafluoroethylene-hydroxylated(perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases. One family of fluorocarbon-type resins having sulfonic acid group functionality is NAFION (TM) resins (commercially available from E. I. du Pont de Nemours and Company, Wilmington, Del.).

Electrodes 116 and 114 may comprise a catalyst suitable for performing the needed electrochemical reaction (i.e., electrolyzing water and producing hydrogen). Suitable catalyst include, but are not limited to, materials comprising platinum, palladium, rhodium, carbon, gold, tantalum, tungsten, ruthenium, iridium, osmium, alloys thereof, and the like. Electrodes 116 and 114 may be formed on membrane 118, or may be layered adjacent to, but in contact with, membrane 118.

Screen packs 218, 228 support membrane 118, allow the passage of system fluids, and preferably are electrically conductive. The screen packs 218, 228 may include one or more layers of perforated sheets or a woven mesh formed from metal or strands.

Pressure pad 230 provides even compression between cell components, is electrically conductive, and therefore generally comprises a resilient member, preferably an elastomeric material, together with a conductive material. Pressure pad 230 is capable of maintaining intimate contact to cell components at cell pressures up to or exceeding about 100 psi, preferably about 500 psi, more preferably about 2,500 psi, or even more preferably about 10,000 psi. The pressure pads can thus be introduced into a high-pressure electrochemical cell environment. The foregoing is intended for illustration, and not limitation.

Figure 3:
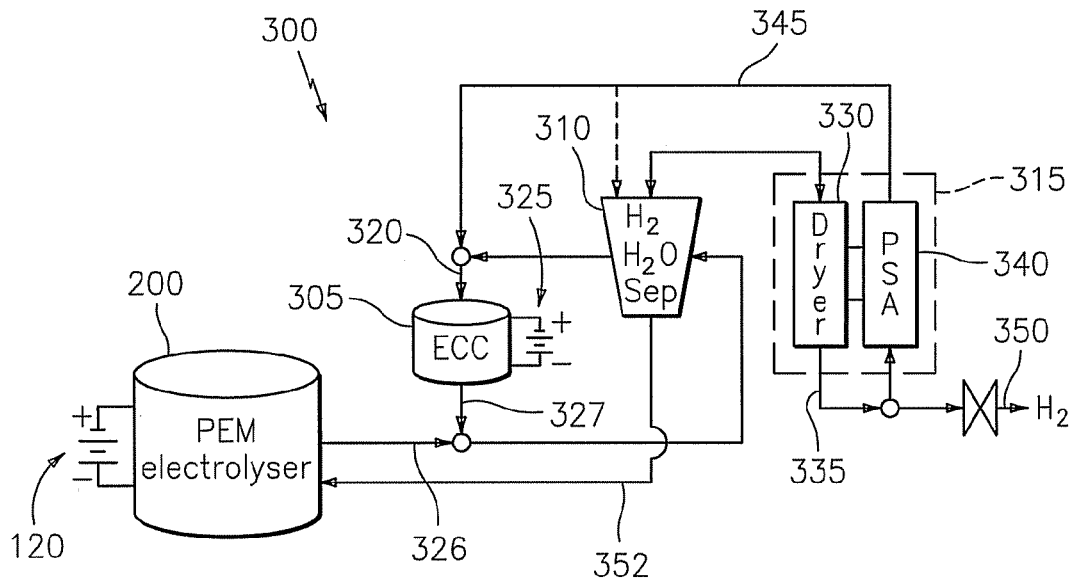
FIG. 3 depicts a gas recovery system in accordance with embodiments of the invention.

Referring now to FIG. 3, an embodiment of a gas recovery system 300, such as an electrochemical cell system for example, is depicted. The system 300 includes a gas source 200, such as an electrochemical cell 200, for example, an electrochemical compressor (ECC) 305, a phase separator 310, and a gas dryer 315 (also herein referred to as a dryer). An exemplary electrochemical cell 200 is an electrolysis cell.

Figure 1:
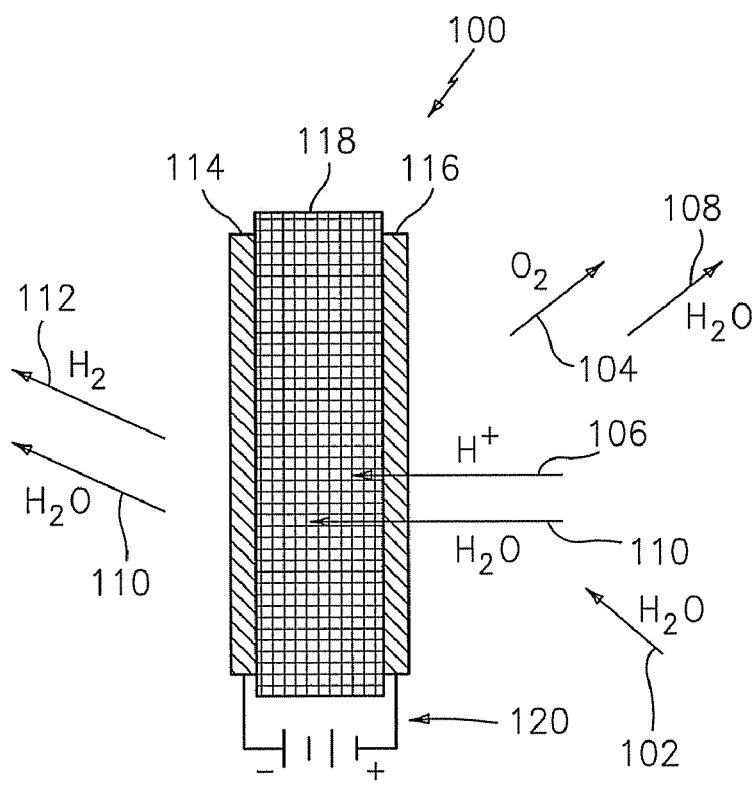
FIG. 1 depicts a schematic diagram of a partial electrochemical cell in accordance with embodiments of the invention.

The electrochemical cell 200 produces a stream 326, such as a gaseous stream including hydrogen 112 and water 110 (best seen in reference to FIG. 1) in response to a supply of process water 102 and electrical power via the power source 120. The water 110 within the gaseous stream 326 produced by the electrochemical cell 200 is at least one of liquid water and water vapor. The electrochemical cell 200 is in fluid communication with and upstream of the phase separator 310. The gaseous stream 326 is provided to the phase separator 310, which separates hydrogen gas from liquid water. It will be appreciated that while the phase separator 310 separates hydrogen gas from liquid water, the hydrogen gas may still include water vapor.

While an embodiment of the invention has been described as a gas recovery system 300 with an electrochemical cell 200 as a gas source, it will be appreciated that the scope of the invention is not so limited, and that the invention will also apply to other sources of the gaseous stream including water, such from hydrocarbon reforming, cellulose digestion, and hydrogen production from biomass, for example.

The ECC 305 is in fluid communication with and downstream of the phase separator 310 and the dryer 315 (as will be described further below). The ECC 305 receives hydrogen and water vapor as an input 320. In response to a supply of electrical power via a power source 325, the ECC 305 is configured to produce a compressed stream 327 that has a pressure of hydrogen greater than a pressure of hydrogen at the input 320. The compressed stream 327, having the pressure of hydrogen greater than the pressure of hydrogen at the input 320, (and also including water) is provided to the phase separator 310.

Hydrogen, including water vapor (but absent liquid water) is transported to the dryer 315 in fluid communication with and upstream of the electrochemical cell 200 via the phase separator 310. The dryer 315 receives the gaseous stream 326 provided by the electrolysis cell 200 and processed by at least one of the phase separator 310 and the ECC 305. The dryer 315 produces a dry delivery stream 335 of hydrogen gas absent moisture for use by an end user or an end user system. An absorption unit 330 of the gas dryer 315 removes water vapor from the hydrogen, to produce the dry delivery stream 335. A transfer unit 340 of the dryer 315, such as a PSA, utilizes a slipstream 345, or portion of the delivery stream 335 provided by the absorption unit 330 to absorb moisture from and regenerate the absorption unit 330. That is, the transfer unit 340 uses the slipstream 345 to regenerate the absorption unit 330 to prevent saturation, or an inability to remove additional water vapor from the gaseous stream 326 provided by the electrolysis cell 200. The slipstream 345 represents about 5 to 15 percent of the hydrogen within the gaseous stream 326 produced by the electrolysis cell 200 (and processed through the phase separator 310 and absorption unit 330) to regenerate the absorption unit 330. Dry hydrogen from the delivery stream 335 is provided at the desired delivery pressure at a product output 350.

The ECC 305 is disposed downstream of the dryer 315 and recovers from the transfer unit 340 the hydrogen gas from the slipstream 345, thereby increasing a productive efficiency of the electrochemical cell system 300. That is, use of the ECC 305 as described herein eliminates the venting (loss) of the hydrogen in the slipstream 345. Additionally (as described above), a mixture of hydrogen and water vapor from the phase separator 310 may also be provided to the ECC 305. Furthermore, the ECC 305 receives the slipstream 345 (including water vapor) and the hydrogen gas from the phase separator 310 (collectively indicated as input 320) at a first pressure, and in response to the supply of electrical power via the power supply 325, produces the compressed stream 327 at a second pressure greater than the first pressure. It will be appreciated that this will continue as necessary to provide the desired delivery pressure at the product output 350. Liquid water separated from by the phase separator 310 is returned to the electrolysis cell 200 via a water conduit 352 as an input for subsequent electrolysis. In an alternate embodiment, (as depicted by the dashed line in FIG. 3), the transfer unit 340 provides the slipstream 345 to the phase separator 310 before the ECC 305, to separate any liquid water from the slipstream 345. In further embodiments, more than one phase separator 310 is utilized to individually separate liquid water 110 from hydrogen 112 from more than one stream, such as one or more of the gaseous stream 326, the slipstream 345, and the compressed stream 327, for example. As compared with a mechanical compressor, the ECC 305 is cleaner, quieter, and has no moving parts. Accordingly, it is contemplated that the ECC 305 will enhance a reliability of the electrochemical cell system 300.

Recovery of the slipstream 345 of hydrogen (which has typically been vented) increases a proportion of hydrogen available for delivery at the product output 350 relative to the amount of hydrogen 112 produced by the electrolysis cell 200. Accordingly, recovery of the slipstream 345 of hydrogen increases a productive efficiency of the system 300 and is estimated to reduce an electrical power consumption of the system 300 by about 2 to 10 kilowatt-hours per kilogram of hydrogen delivered at the product output 350.

Inefficiencies associated with operation of the electrolysis cell 200 and the ECC 305 include a back diffusion of hydrogen (I loss) component that is related to pressure, and an electrical resistance (R loss) component that is related to the electrical power provided to the cell 200 and the ECC 305 via the power supplies 120, 325.

In an embodiment, the electrolysis cell 200 is a low-pressure electrolysis cell 200, such as to produce hydrogen 112 gas near ambient pressure for example. Use of the low pressure electrolysis cell 200 can represent a low cost, high efficiency stage, which exhibits only the electrical resistance (R loss) component. The ECC 305 will compress, or increase the pressure of hydrogen 112 provided by the low-pressure electrolysis cell 200 to the desired delivery pressure. Therefore, because of the pressure differential across the ECC 305, it will exhibit an I loss as well as an R loss. Accordingly, because all of the gas produced by the low-pressure electrolysis cell 200 will need to be compressed by the ECC 305 to the desired delivery pressure, an overall inefficiency for operation of the system 300 using the low-pressure electrolysis cell 200 can be represented as 2R+I. Use of the low-pressure electrolysis cell 200 significantly reduces a likelihood of mixture of oxygen and hydrogen. As used herein, the term "near ambient pressure" shall represent the low-pressure electrolysis cell 200 productive of hydrogen gas at such a pressure that a contribution of inefficiency due to back diffusion (I loss) of hydrogen can be considered to be negligible.

In another embodiment, the electrolysis cell 200 is a high-pressure electrolysis cell 200, which produces hydrogen 112 at, or very near, the desired delivery pressure. In an embodiment, the high-pressure electrolysis cell 200 produces hydrogen gas 112 up to about 15 bar. In another embodiment, the high-pressure electrolysis cell 200 produces hydrogen gas 112 between about 15 bar and 30 bar. In yet another embodiment, the electrolysis cell 200 produces hydrogen gas 112 between about 30 bar and 200 bar.

Because the high-pressure electrolysis cell 200 produces hydrogen 112 (along with water 110) at or near the desired delivery pressure, the ECC 305 is contemplated to perform much less work to increase the pressure of the hydrogen 112 to the desired delivery pressure. Accordingly, a flow through the input 320 to the ECC 305 is contemplated to be reduced substantially to that of the slipstream 345 from the transfer unit 340, for recovery of the slipstream 345 hydrogen. In an exemplary embodiment, the system 300 incorporating a high-pressure electrolysis cell is contemplated to incorporate an ECC 305 that is approximately one-tenth the capacity of an ECC 305 used by the system 300 that incorporates a low-pressure electrolysis cell.

Because the compression performed by the ECC 305, in conjunction with the high-pressure electrolysis cell 200, is reduced, the power input 325 and accompanying electrical resistance (R loss) is reduced. Further, the reduced pressure differential across the ECC 305 results in a reduced back diffusion (I loss). However, the increased pressure differential across the high-pressure electrolysis cell 200 results in an increased I loss as compared to use of the low-pressure electrolysis cell. Use of the high-pressure electrolysis cell 200 results in an inefficiency for operation of the system 300 using the high-pressure electrolysis cell 200 that is represented as 1.1R+1.1I.

While embodiments of the invention have been described having a low-pressure electrolysis cell 200 producing hydrogen 112 at ambient pressure and a high-pressure electrolysis cell 200 producing hydrogen 112 at, or near, the desired delivery pressure, it will be appreciated that the scope of the invention is not so limited, and that the invention will also apply to electrochemical cell systems 300 that include electrolysis cells 200 that produce hydrogen gas 112 at any pressure between ambient and the desired delivery pressure. It will be further appreciated that a required capacity of the ECC 305 (and a corresponding system 300 inefficiency representation) will be determined, in part, on the relationship between the pressure output of the electrolysis cell 200, the desired delivery pressure, and a quantity of the flow of the hydrogen slipstream.

Figure 4:
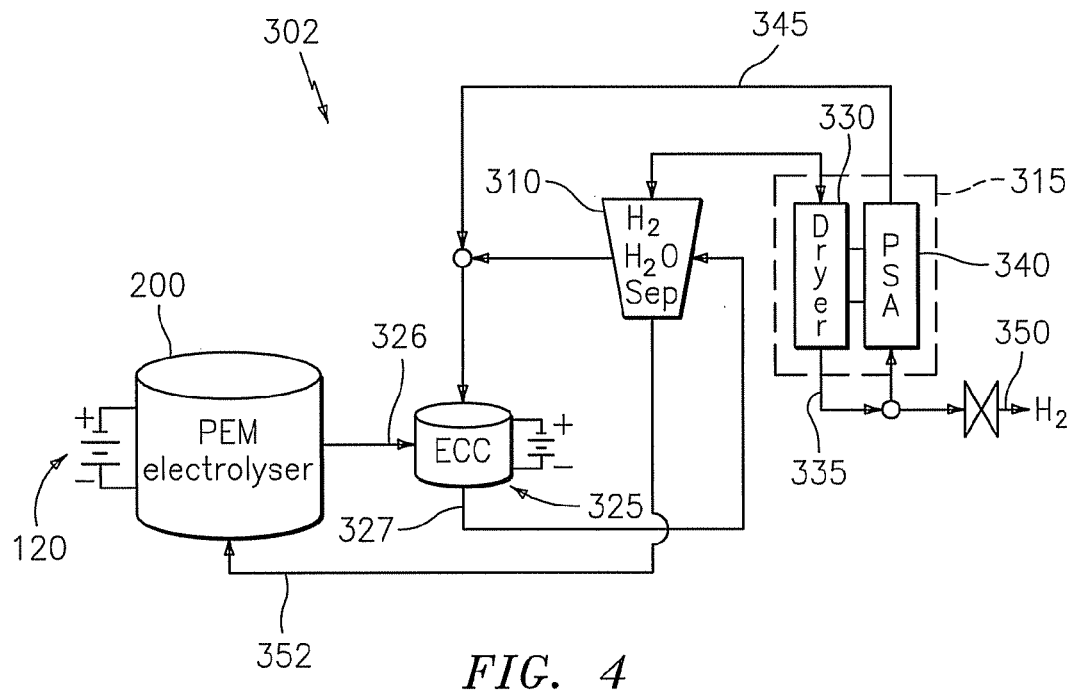
FIG. 4 depicts a gas recovery system in accordance with embodiments of the invention.

FIG. 4 depicts an exemplary arrangement of a gas recovery system 302 including the components described above. In an embodiment of the system 302 depicted in FIG. 4, the electrolysis cell 200 provides the stream 326 (including hydrogen 112 and water 110) directly to the ECC 305 without passing through the phase separator 310. That is, the ECC 305 processes both hydrogen 112 and water 110 without phase separation. It will be appreciated that in the system 302, the ECC 305 directly receives the slipstream 345 from the transfer unit 340.

Figure 5:
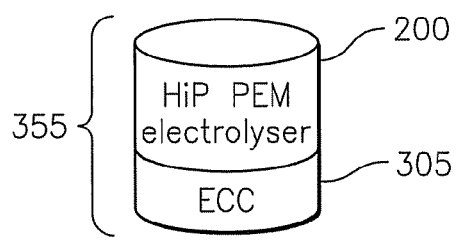
FIG. 5 depicts an electrochemical cell in accordance with embodiments of the invention.

FIG. 5 depicts an alternate embodiment in which the high-pressure electrolysis cell 200 and the ECC 305 are integrally arranged as sub-sections of a single cell stack 355. Flow ports within the stack 355 control flow between the subsections 200, 305.

Figure 6:
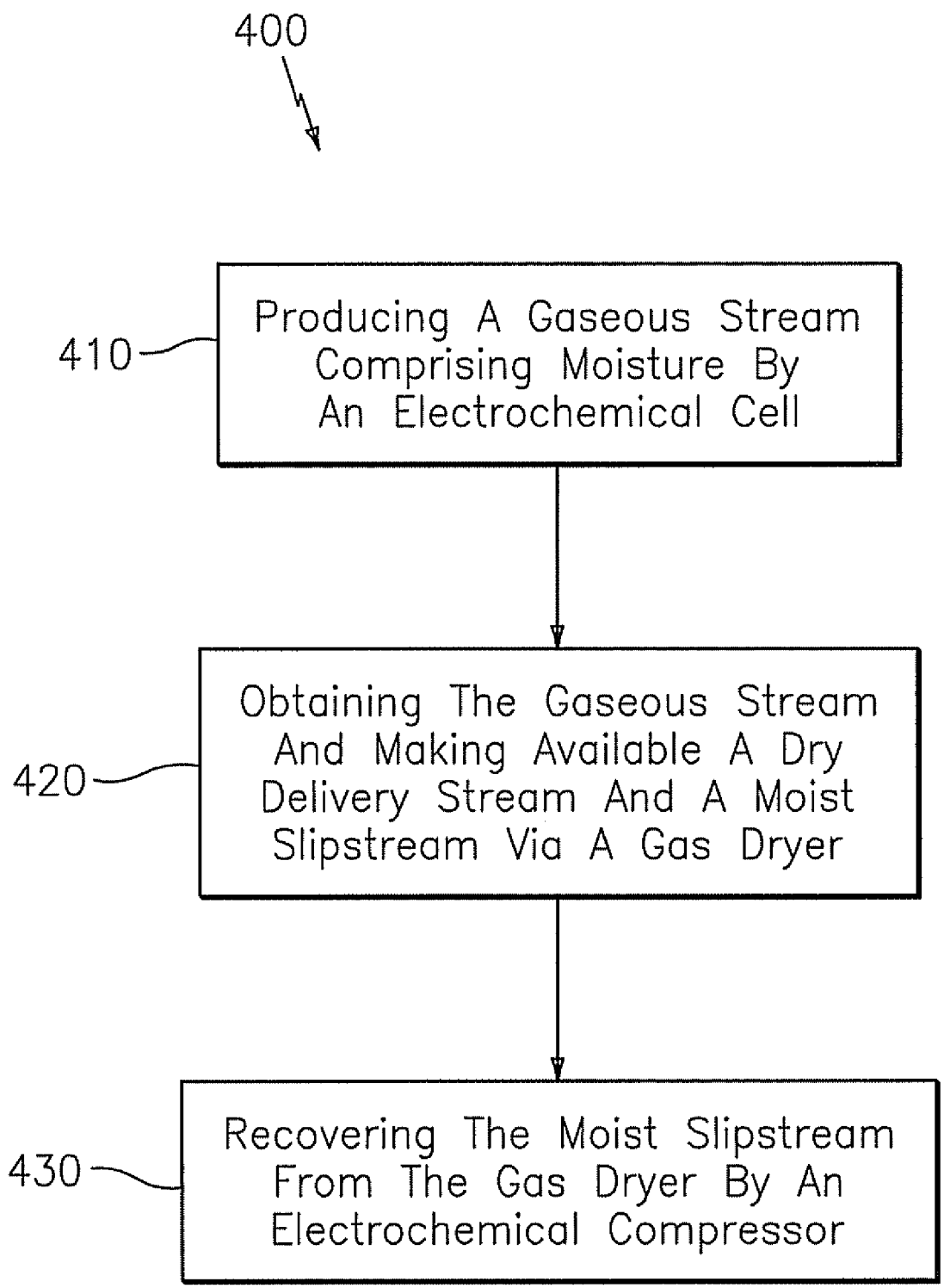
FIG. 6 depicts a flowchart of process steps for increasing a productive efficiency of a gas production system in accordance with embodiments of the invention.

Referring now to FIG. 6, a flowchart 400 of process steps for increasing a productive efficiency of a gas production system, such as facilitated by the gas recovery system 300 is depicted.

The process begins with producing at Step 410 the gaseous and liquid stream 326 comprising water and hydrogen by the electrolysis cell 200. The process continues by obtaining at Step 420 the stream 326 and making available the dry delivery stream 335 and the moist slipstream 345 via the gas dryer 315. The process proceeds by recovering at Step 430 the moist slipstream 345 from the gas dryer 315 by an electrochemical compressor 305, thereby increasing the productive efficiency of the electrochemical cell system 300. In an embodiment, the recovering at Step 430 includes recovering hydrogen gas.

In an embodiment, the recovering at Step 430 includes obtaining the slipstream 345 at a first pressure. In response to the recovering at Step 430, the process further includes generating a compressed stream at a second pressure greater than the first pressure. In an embodiment, the process further includes separating hydrogen gas from liquid water via the phase separator 310.

In an embodiment, producing the gaseous stream 326 includes producing hydrogen gas by the electrolysis cell 200. In one embodiment, the electrolysis cell 200 produces hydrogen gas near ambient pressure. In another embodiment, the electrolysis cell 200 produces hydrogen gas at a pressure less than or equal to 15 bar. In another embodiment, the electrolysis cell 200 produces hydrogen gas at a pressure greater than 15 bar and less than or equal to 30 bar. In further embodiments, the electrolysis cell 200 produces hydrogen gas at a pressure greater than 30 bar and less than or equal to 200 bar.

As disclosed, some embodiments of the invention may include some of the following advantages: the ability to recover hydrogen from a slipstream used to regenerate a gas dryer; the ability to increase a productive efficiency of an electrochemical cell system; the ability to reduce an overall power consumption of an electrochemical cell system; and the ability to increase a reliability of an electrochemical cell system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A gas recovery system comprising:
a gas source productive of a gaseous stream comprising moisture;
a gas dryer in fluid communication with and downstream of the gas source, the gas dryer disposed to receive the gaseous stream and produce a delivery stream absent moisture and a slipstream comprising moisture; and
an electrochemical compressor in fluid communication with and downstream of the gas dryer, the electrochemical compressor disposed to receive the slipstream at a first pressure and produce a compressed stream at a second pressure greater than the first pressure.

2. The system of claim 1, further comprising:
a phase separator in fluid communication with and downstream of the gas source, the phase separator in fluid communication with and downstream of and upstream of the electrochemical compressor, the phase separator in fluid communication with and upstream of the gas dryer.

3. The system of claim 1, wherein:
the gas source is an electrochemical cell.

4. The system of claim 3, wherein:
the electrochemical cell and the electrochemical compressor are integrally arranged to define a single cell stack.

5. The system of claim 4, further comprising:
flow ports within the single cell stack that control flow between the electrochemical cell and the electrochemical compressor.

6. The system of claim 3, wherein:
the electrochemical cell is an electrolysis cell.

7. The system of claim 6, wherein:
the gaseous stream, the delivery stream, and the slipstream comprise hydrogen gas.

8. The system of claim 7, wherein:
the electrochemical compressor is disposed to recover the hydrogen gas from the slipstream to increase a productive efficiency of the electrochemical cell system.

9. The system of claim 6, wherein:
the electrolysis cell produces hydrogen gas near ambient pressure.

10. The system of claim 6, wherein:
the electrolysis cell produces hydrogen gas at a pressure less than or equal to 15 bar.

11. The system of claim 6, wherein:
the electrolysis cell produces hydrogen gas at a pressure greater than 15 bar and less than or equal to 30 bar.

12. The system of claim 6, wherein:
the electrolysis cell produces hydrogen gas at a pressure greater than 30 bar and less than or equal to 200 bar.

13. The system of claim 1, wherein:
the gas dryer comprises a Pressure Swing Adsorption unit in fluid communication with and upstream of and downstream of the electrochemical compressor.

14. The system of claim 1, wherein:
the slipstream is greater than about 5 percent and less than about 15 percent of the gaseous stream.

15. A method to increase a productive efficiency of a gas production system, the method comprising:
producing a gaseous stream comprising moisture by a gas source;
obtaining the gaseous stream and making available a dry delivery stream and a moist slipstream via a gas dryer;
recovering the moist slipstream from the gas dryer by an electrochemical compressor and adding it to the gaseous stream, thereby increasing the productive efficiency of the gas production system.

16. The method of claim 15, wherein:
the recovering comprises obtaining the slipstream at a first pressure and in response thereto, generating a compressed stream at a second pressure greater than the first pressure.

17. The method of claim 15, further comprising:
separating hydrogen gas from liquid water in the gaseous stream and the moist slipstream via a phase separator.

18. The method of claim 15, wherein the producing comprises:
producing a gaseous stream by an electrochemical cell.

19. The method of claim 15, wherein the producing comprises:
producing a gaseous stream comprising hydrogen gas by an electrolysis cell.

20. The method of claim 19, wherein the producing comprises:
producing hydrogen gas near ambient pressure.

21. The method of claim 19, wherein the producing comprises:
producing hydrogen gas at a pressure less than or equal to 15 bar.

22. The method of claim 19, wherein the producing comprises:
producing hydrogen gas at a pressure greater than 15 bar and less than or equal to 30 bar.

* * * * *